United States Patent Office 3,230,936
Patented Jan. 25, 1966

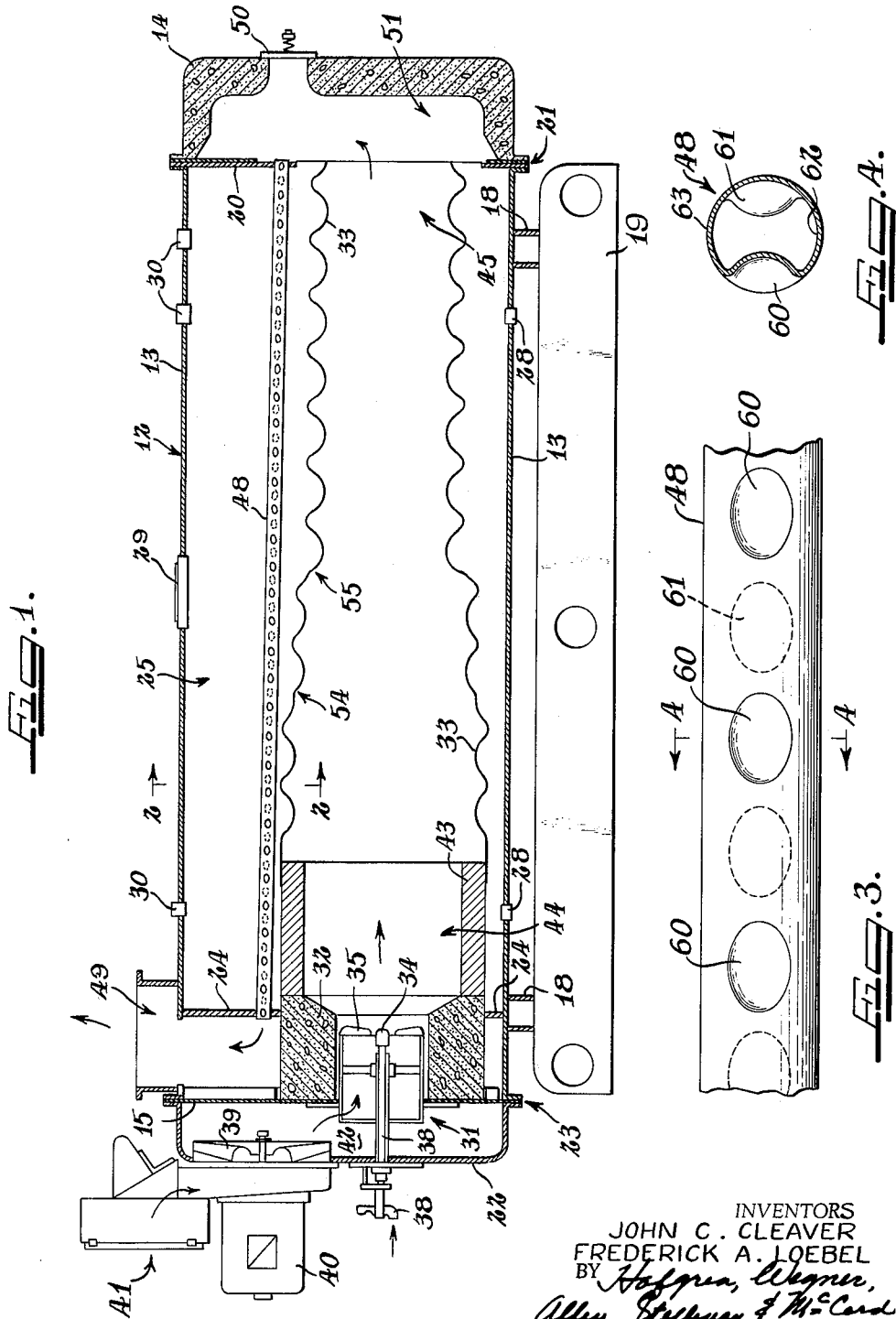
Jan. 25, 1966   J. C. CLEAVER ETAL   3,230,936
HEAT EXCHANGE APPARATUS
Filed July 1, 1963   2 Sheets-Sheet 1
INVENTORS
JOHN C. CLEAVER
FREDERICK A. LOEBEL

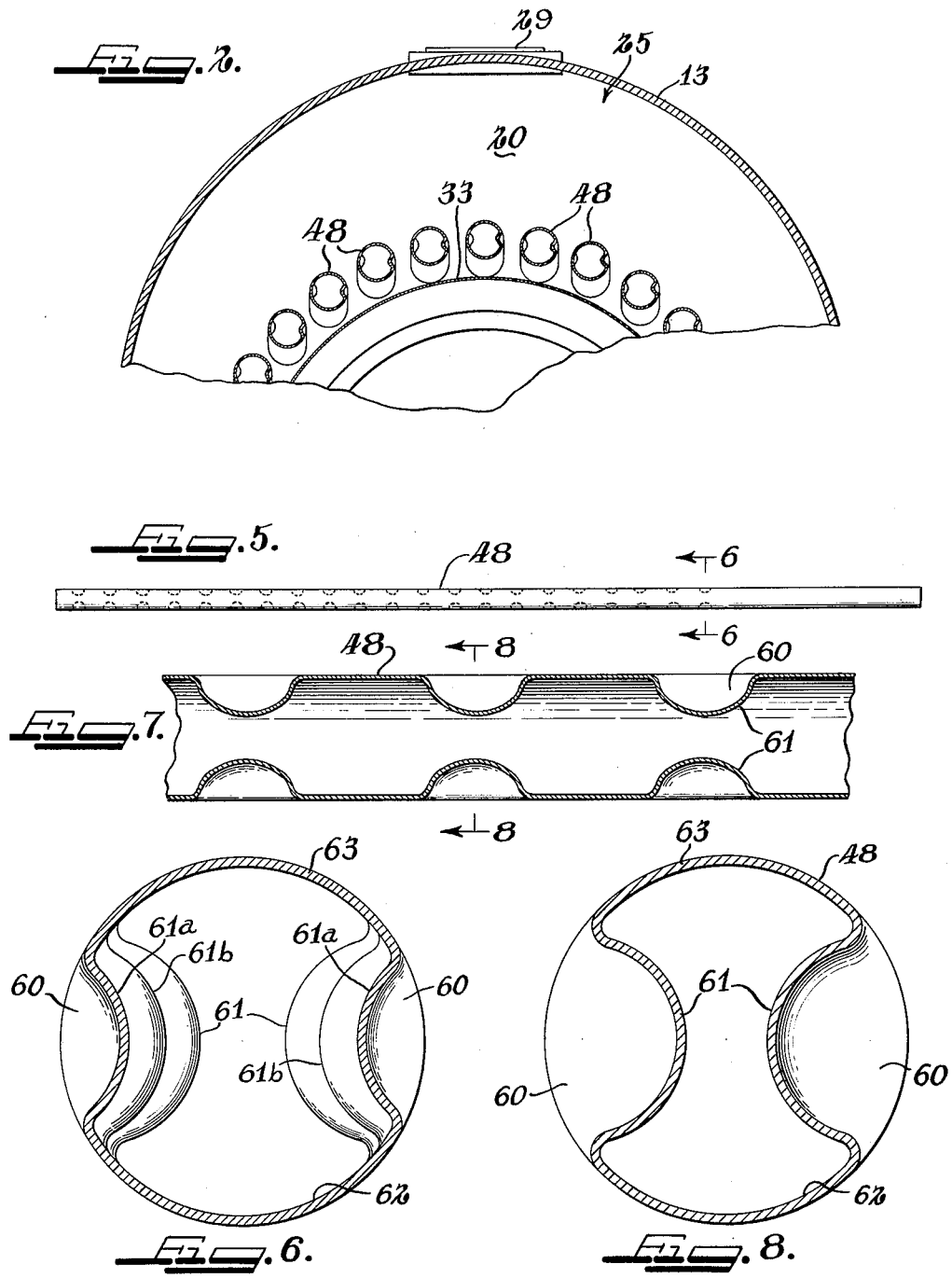

3,230,936
HEAT EXCHANGE APPARATUS
John C. Cleaver and Frederick A. Loebel, Milwaukee, Wis., assignors to Cleaver-Brooks Company, a corporation of Wisconsin
Filed July 1, 1963, Ser. No. 291,674
5 Claims. (Cl. 122—149)

This invention relates to heat exchange apparatus and especially to such apparatus for use in boilers and the like. More particularly, the present invention relates to furnaces and heat exchange tubes and also to assemblies and boilers including the same.

In heat exchange apparatus, it is important to improve the efficiency of heat transfer of the equipment involved. For example, in boilers where hot gases are generated or formed in a fire box or flue and passed in heat exchange with a body of water, improved efficiency in heat transfer can result in considerable savings in fuel and the like or in heat transfer operation time for heating a given body of water. Often in a boiler structure, e.g., where a body of water is heated to provide hot water or steam, hot gases are formed in a fire box or flue positioned or extending through the body of water in heat exchange with the body of water. The flue gases are then returned one or more additional passes through heat exchange tubes also disposed through the body of water or otherwise in heat exchange therewith.

Where the hotest gases enter the heat exchange tube, the gases are of greater volume than at the tube outlets. As the gases progress down the tube and cooling of the gases is thereby effected, their volume rate of flow is commensurately decreased and the decreased rate of flow of cooler gases toward the tube outlet ends results in less heat exchange through the tubes adjacent the outlet end thereof than adjacent the inlet end.

Also, a straight or relatively linear pass of gases through heat exchange tubes is less desirable from the standpoint of heat exchange than is turbulent flow.

For turbulent flow through heat exchange tubes, it has been proposed to provide bosses or protuberances on the interior surfaces of heat exchange tubes to direct gases therethrough in a turbulent flow path for better contact of all gases with the tube walls for more efficient heat exchange. However, liquids, such as condensate, within the tubes, and especially condensed water, may collect in the tubes and cause rusting or other corrosion.

It is a general object of this invention to provide new and useful heat exchange apparatus which may be used for improved transfer of heat in heat exchange systems.

It is also an object of this invention to provide such heat exchange apparatus wherein flow through heat exchange tubes is regulated in accordance with a preselected tube design.

A further object of this invention is to provide for adequate drainage of liquids such as condensate from heat exchange tubes in heat exchange apparatus.

Still another object of this invention is to provide new and useful furnace design for use in a boiler in advantageous combination with tubes or assemblies of tubes, e.g., in accordance with any of the foregoing objects.

Other objects of this invention will be apparent from the following descriptions and the drawings in which:

FIGURE 1 is a vertical section through a boiler incorporating an embodiment of heat exchange apparatus in accordance herewith;

FIGURE 2 (sheet 2) is an enlarged partial section through the boiler of FIGURE 1 along line 2—2 of FIGURE 1;

FIGURE 3 (sheet 1) is an enlarged view of a portion of heat exchange tube in the boiler of FIGURE 1;

FIGURE 4 is a vertical section through the heat exchange tube of FIGURE 3 along line 4—4;

FIGURE 5 is a top view in a different scale of another form of heat exchange tube which may be used, for example, in the boiler of FIGURE 1;

FIGURE 6 is an enlarged section through the tube of FIGURE 5 along line 6—6;

FIGURE 7 is an enlarged horizontal section through still another form of heat exchange tube usable in the device of FIGURE 1 in accordance herewith; and FIGURE 8 is an enlarged vertical section through the heat exchange tube of FIGURE 7 along line 8—8 of FIGURE 7.

While this invention is susceptible of embodiment in many different forms, there is shown in the drawings and will herein be described in detail a specific embodiment of the invention and modifications thereof with the understanding that the present disclosure is to be considered as an exemplification of the principles of the invention and is not intended to limit the invention to the embodiment or modifications illustrated.

Briefly, the present invention provides new and useful heat exchange apparatus with regulated flow through heat exchange tubes, e.g., during heat exchange operations and/or for drainage purposes. The heat exchange apparatus is useful in a preferred embodiment in combination with a furnace which permits advantageous disposition of heat exchange tubes peripherally thereof in a boiler system. In one aspect of the invention, the regulated flow through the heat exchange tubes is provided by a plurality of bosses on the interior surface of the tube wall of increasing size along at least a portion of the length of the tube to provide regulated flow of heating fluid through the tube.

In another aspect, a preferred form of the heat exchange tube includes a plurality of bosses on the interior surface with the tube mounted in a position with the bosses disposed laterally, as opposed to the top or bottom surface of the tube.

Turning first to FIGURES 1 and 2 of the drawings, there is shown a boiler exemplifying principles of the present invention. The illustrated boiler includes a casing 12 composed of a metal tube or cylindrical wall 13, a refractory end cap 14 and a plate 15. Boiler casing 12 is supported by legs 18 from pedestal 19. Within the boiler, heat exchange passages for flow of combustion gases and water are provided as will be described.

A first tube sheet 20 is secured at a flanged joint 21 to end cap 14 by bolts or welding or other suitable means. Tube sheet 20 is also welded or otherwise secured to one end of cylindrical metal tube 13. A second end cap 22 is secured to plate 15 and the other end of tube 13 at flange 23 by bolts or welding or other suitable means. At least one of end caps 14 and 22 and preferably end cap 22 is releasable at flange 23, e.g., being secured by means of bolts or the like so that the end cap and plate 15 can be removed for servicing of internal parts and replacement of boiler tubes when desired.

A second tube sheet 24 is provided opposing tube sheet 20 and is suitably secured by welding or the like to the inner wall of boiler wall 13. A water and/or steam chamber 25 is defined between end plates 20 and 24 and within boiler wall 13. Water supply or feed inlets 28 are provided in wall 13 for charging water to chamber 25 and a steam outlet 29 is provided for withdrawal of steam from chamber 25. Indicated at 30 are fittings through wall 13 for attachment of pressure gauges or the like, which fittings may be plugged or capped when not used.

An oil burner 31 is provided mounted in refractory material 32 secured within a furnace casing tube or tubular wall 33. Burner 31 includes a nozzle for discharge of fuel, e.g., in the form of oil or oil-air mixture, and stationary impellers 35 adjacent the nozzle for direction of an air supply for admixture with fuel ejected from nozzle 34. Nozzle 34 is supplied with fuel through oil feed line 38 and the burner 31 is supplied with air by fan 39 driven by motor 40 which draws air from air inlet 21 and forces the air through air chamber 42 against impeller blades 35. Adjacent the nozzle 34, a circumferential thick layer of fire resistant insulation is provided on the interior face of furnace wall 33. Furnace wall 33 is supported by tube sheets 20 and 24 adjacent opposing ends of the furnace tube 33, the furnace tube passing through a large circular aperture in each tube sheet and being welded or otherwise suitably secured to the tube sheet. Burner 31 is supported by suitable mounting means from end plate 15 and is removable therefrom for servicing.

Tracing now the flow of materials through the boiler, oil or other suitable fuel is burned at nozzle 34 which is supplied with air from inlet 41 and supplied with fuel through line 38 in the direction of the arrows shown. The combustion gases are formed in and flow along tube 33, as shown by the arrows. Chamber 25 has been filled with water to the level desired through inlet 28 and the combustion gases passing down fire tube 33 heat the water within the boiler chamber by heat exchange. At the righthand end of fire tube 33 as viewed in FIGURE 1, the combustion gases are redirected from the outlet end 45 of tube 33 into inlet ends of a plurality of heat exchange tubs 48 forming an arched or curved array around at least the upper portion of tube 33. The combustion gases flow from the outlet ends of tubes 48 to outlet chamber or manifold 49 and thence to discharge.

Cap 14 includes a pressure release valve in the form of a pressure-loaded cover 50. Further, cap 14 defines a chamber in conjunction with tube sheet 20 which serves as a conduit for directing return of combustion gases through the boiler chamber via tubes 48. As the combusion gases pass or return through tube 48, further heat exchange with the surrounding water in chamber 25 is effected.

The operation of the boiler is conventional for a horizontal tube boiler employing a fire tube type furnace for generating hot water or steam or the like.

It will be noted that fire tube or furnace tube 33 is corrugated for increased surface area for heat exchange with the water in the boiler. However, in addition, the cross sectional area and diameter of the furnace tube decrease along the length thereof as viewed in FIGURE 1 from left to right, the decrease in diameter in the illustrated form being in the form of steps indicated generally by reference numerals 54 and 55. The stepped configuration not only compensates for the decrease in volume of combustion gases as they become cooler near end 45 than near 44 within tube 33, but also is advantageous from the standpoint of permitting incline of tubes 48, e.g., to the right as viewed in FIGURE 1, in a preferred form of the present invention as will become more apparent hereinbelow.

Turning now to FIGURES 3–8, a variety of modifications of heat exchange tubes 48 are illustrated. The tube modification illustrated in FIGURES 1, 3 and 4 includes a plurality of two linear arrays of indentations or dimples in the exterior surface of the tube, each indentation defining a corresponding raised portion or boss on the interior surface of the tube. Thus, there are two linear arrays of bosses 61 provided by the indentations 60. The two linear arrays diametrically oppose each other and tube 48 is mounted through tube sheets 20 and 24 with the linear arrays disposed generally laterally, i.e., with their centers in a generally horizontal plane, to provide an uninterrupted lower surface 62 on the interior of tube 48.

The uninterrupted or unbossed surface 62, combined with the incline of tubes 48 to the right as viewed in FIGURE 1, provides gravity drainage of condensed liquids from the tubes, e.g., upon cessation of flow of combustion gases therethrough. Thus, in a preferred form, the lower surface of each mounted tube is essentially a longitudinal tubular section surface providing uninterrupted gravity flow. Surface 62 may be considered as a drainage trough in the bottom of the bossed tube interior. Surface 62 is free from corrugations, bosses, or spiralling interruptions of flow along surface 62 which would create dams throughout the length of the tube for retaining moisture.

It will be apparent with reference to FIGURES 1–4 that in one aspect, the heat exchange tube is preferably capable of preventing a pool of water, e.g., condensate, from forming in a horizontal plane and from collecting within the tube, since a free drainage surface is provided. Also, in a preferred illustrative form, the top surface 63 is free of indentations 60 on the exterior to prevent a pool of water from forming in the horizontal plane on the water side of the tube and to promote, during steam generation use therefor, steam release more readily when the tube is heated. Also, when the boiler is drained of water for any reason, all dimples or indentations 60 are also drained since they are disposed on the side of tube 48, none of the dimples being in the horizontal plane on top surface 63 for retaining of pools of water. The free drainage of water from both sides of the tubes is of importance in preventing undue rust or other corrosion of the tube walls.

The bosses within the tubes cause turbulence of gases passing through the tubes, thereby increasing heat transfer rate. In the form of FIGURES 3 and 4, the knobs in the lateral walls of the tubes are staggered between the two arrays to form a tortuous passage for the gases passing therethrough to enhance turbulence in heat transfer. Staggering of bosses also makes the tubes easier to clean.

Turning especially to FIGURES 5 and 6, a form of heat exchange tube 48 is illustrated having bosses 61 of increasing size or volume along at least a portion of the length of tube 48, the knobs increasing in volume from right to left as viewed in FIGURE 5. The section through the tube in FIGURE 6 shows in somewhat exaggerated form a plurality of bosses 61a through 61c which may be seen looking down the tube interior. In this form of the heat exchange tube, provision is made for not only turbulence of gases passing through the tubes and drainage via surface 62 along with drainage of the tube top 63, but also the progressively increasing volume of the bosses along the tube to accommodate the reduction in volume of gas to cooling of the gas within the tube, resulting in a relatively constant velocity of gas flowing through the tube. More effective heat exchange is accordingly attained, eliminating or minimizing the longer dwell of cooler gases within the tube. Tube 48 in this embodiment is of constant diameter and is still adapted to accommodate the cooling gases under relatively constant flow rate conditions, in that the progressive increase in boss volume results in commensurate decrease of flow volume along the tube. Other disposition of bosses, e.g., bosses of constant size but spaced progressively closer together along the tube, may also be conveniently employed in such a constant diameter tube to effect somewhat similar results.

Turning now to FIGURES 7 and 8, still another tube is provided, similar to the form of FIGURES 3 and 4 except that the indentations 60 and bosses 61 are not staggered but rather directly oppose each other in the opposing linear arrays. The modification of FIGURES 7 and 8 also advantageously permits complete draining of the tube as described above and, assuming, although not necessary and not shown in FIGURES 7 and 8, that the equal size indentations and bosses 60 and 61 are spaced closer together along the length of the tube from right to left as viewed in FIGURES 1 and 7, the tube is also adapted for compensating for having decreased volume and flow rate of gases due to cooling while flowing therethrough. As illustrated in FIGURE 5, the bosses may be progressively larger along the length of the tube in order to provide a greater volume of indentations with the resulting reduced volume of passage for the gases. If desired, the same effect may be achieved by progressively spacing equal size bosses closer together.

The foregoing detailed description is given for clearness of understanding only, and no unnecessary limitations should be understood therefrom for some modifications will be obvious to those skilled in the art.

We claim:

1. A heat exchange tube comprising a long tubular member having opposing open ends and a generally annular wall of relatively uniform cross sectional area and diameter throughout its length, a plurality of indentations from the exterior of said wall defining dome-like spaced bosses in linear array on the interior surface of said wall of increasing size along at least a portion of the length thereof adjacent boss-free longitudinal interior surface areas along either side of said array and diametrically opposing each other, and mounting means for mounting said tube in a position with the linear array of bosses disposed laterally and one each of said boss-free areas disposed upwardly and downwardly respectively.

2. A heat exchange tube assembly comprising opposing tube sheets and a plurality of heat exchange tubes mounted through and disposed between said tube sheets, each of said tubes having an open end communicating with space exteriorly of that defined between the tube sheets, each of said heat exchange tubes comprising a long tubular member having a generally annular wall, a first plurality of bosses spaced lengthwise on the interior surface of the tube along at least a portion of the length thereof and a second plurality of bosses spaced lengthwise along the interior surface of said tube opposing said first plurality of bosses and defining a non-bossed trough portion therebetween, said tube sheets securing each of said tubes in generally horizontal disposition on an incline from one tube sheet to another sufficient to provide complete gravity draining of liquid through said trough portion from each tube beyond at least one of said tube sheets, said tubes being mounted through said tube sheets with the spaced bosses disposed generally laterally and said trough disposed downwardly.

3. The heat exchange tube assembly of claim 2 wherein said plurality of tubes comprises an arched array of tubes.

4. The heat exchange tube assembly of claim 2 wherein each of said tubes is of relatively uniform sectional area throughout its length and the bosses are of increasing size in one direction along the interior surface and down the incline of each tube.

5. A heat exchange tube comprising a long tubular member having opposing open ends and a generally annular wall of relatively uniform cross sectional area and diameter throughout its length, a plurality of indentations from the exterior of said wall defining dome-like spaced bosses in linear array on the interior surface of said wall, there being an increasing volume of said bosses along at least a portion of the length of said wall adjacent boss-free longitudinal interior surface areas along either side of said array and diametrically opposing each other, and mounting means for mounting said tube in a position with the linear array of bosses disposed laterally and one each of said boss-free areas disposed upwardly and downwardly respectively.

References Cited by the Examiner

UNITED STATES PATENTS

| | | | |
|---|---|---|---|
| 277,567 | 5/1883 | Hayden | 122—155 |
| 780,535 | 1/1905 | Steber | 122—155 |
| 1,991,788 | 2/1935 | Cartter | 165—133 |
| 2,104,918 | 1/1938 | Weymouth | 122—149 |
| 2,189,135 | 2/1940 | Dickson | 122—149 |
| 2,252,045 | 8/1941 | Spanner | 165—177 X |
| 2,343,542 | 3/1944 | Faunce | 165—133 |
| 2,604,081 | 7/1952 | Hene | 122—149 |

FOREIGN PATENTS 559,236   2/1944   Great Britain.

FREDERICK L. MATTESON, JR., *Primary Examiner.*

KENNETH W. SPRAGUE, PERCY L. PATRICK,
*Examiners.*